United States Patent
Coupe et al.

(10) Patent No.: US 7,581,932 B2
(45) Date of Patent: Sep. 1, 2009

(54) METHOD OF MANUFACTURING A COMPOSITE TURBOMACHINE BLADE, AND A BLADE OBTAINED BY THE METHOD

(75) Inventors: Dominique Coupe, Le Haillan (FR); Bruno Jacques Gerard Dambrine, Le Chatelet en Brie (FR); Stephane Andre Leveque, Massy (FR); Jean-Noel Mahieu, Paris (FR)

(73) Assignee: SNECMA, Paris (FR)

( * ) Notice: Subject to any disclaimer, the term of this patent is extended or adjusted under 35 U.S.C. 154(b) by 507 days.

(21) Appl. No.: 11/550,606

(22) Filed: Oct. 18, 2006

(65) Prior Publication Data

US 2007/0092379 A1    Apr. 26, 2007

(30) Foreign Application Priority Data

Oct. 21, 2005 (FR) .................................. 05 10752

(51) Int. Cl.
*F01D 5/14* (2006.01)
(52) U.S. Cl. ............... 416/230; 416/241 A; 264/257; 264/258; 264/271.1; 264/294; 264/328.2; 264/328.4
(58) Field of Classification Search ................. 416/230, 416/241 A; 29/889.2; 264/257, 258, 271.1, 264/294, 328.2
See application file for complete search history.

(56) References Cited

U.S. PATENT DOCUMENTS

| 4,363,602 A | * | 12/1982 | Martin ..................... 416/230 |
| 5,279,892 A | * | 1/1994 | Baldwin et al. ............. 442/206 |
| 5,672,417 A | * | 9/1997 | Champenois et al. ....... 442/208 |
| 6,056,838 A | * | 5/2000 | Besse et al. ................ 156/75 |

FOREIGN PATENT DOCUMENTS

| EP | 0 743 165 A2 | 11/1996 |
| EP | 0 792 738 A1 | 9/1997 |
| FR | 2 496 716 | 6/1982 |
| FR | 2 740 379 | 4/1997 |
| FR | 2 861 143 | 4/2005 |
| WO | WO 98/50211 | 11/1998 |
| WO | WO 2005/011962 A1 | 2/2005 |

OTHER PUBLICATIONS

Henri Girardy, et al., "Une voie dans l'industrialisation des composites Hautes Performances: des renforts preformables, deformables, injectables", Composites, vol. 29, No. 3, May/Jun. 1989, pp. 135-138, XP000086066.

* cited by examiner

*Primary Examiner*—Ninh H Nguyen
(74) *Attorney, Agent, or Firm*—Oblon, Spivak, McClelland, Maier & Neustadt, P.C.

(57) ABSTRACT

The invention relates to a method of manufacturing a composite turbomachine blade, the method comprising the following steps:
  a) making a preform by three-dimensionally weaving yarns including tracer yarns disposed at least at the surface of the preform;
  b) cutting out said preform so as to leave intact a series of tracer yarns situated along a reference face of the preform;
  c) pre-deforming said cut-out preform;
  d) compacting and stiffening said pre-deformed preform;
  e) providing an injection mold in which said stiffened preform is placed;
  f) heating said injection mold;
  g) injecting a binder into said injection mold, the binder comprising a thermosettable resin; and
  h) extracting from the mold a composite molded part presenting substantially the shape and the dimensions of said blade.

The invention is applicable to a making fan blade.

15 Claims, 2 Drawing Sheets

METHOD OF MANUFACTURING A COMPOSITE TURBOMACHINE BLADE, AND A BLADE OBTAINED BY THE METHOD

The invention relates to a method of fabricating a composite turbomachine blade and to a blade obtained by the method.

FIELD OF THE INVENTION

The blade is a composite blade of the type comprising a preform of three-dimensionally woven fibers or yarns together with a binder maintaining the relative disposition between the yarns of the preform, said preform being made up of warp yarns and of weft yarns, the direction of the warp yarns forming the longitudinal direction of the preform.

In particular, the present invention relates to a fan blade for a turbomachine, in particular a turbojet. Nevertheless, within the context of the present invention it is also possible to envisage making a blade for a low-pressure compressor in which the temperatures reached in operation are compatible with the thermomechanical strength of a blade of this type.

BACKGROUND OF THE INVENTION

Usually, composite material fan blades, in particular fan blades made of carbon fibers, are made from a stack of pre-impregnated unidirectional plies that are placed in a mold with successive plies having different orientations, and with the stack then being compacted and polymerized in an autoclave. That technique is very difficult and requires the ply-stacking operations to be performed manually, which is lengthy and expensive.

Proposals have also been made to prepare preforms woven using dry fibers which are subsequently assembled together by stitching, prior to being impregnated with resin that is injected into a closed mold. An alternative consists in making a single woven preform which is mounted with one or more solid inserts prior to injection. Nevertheless, those solutions (U.S. Pat. Nos. 5,672,417 and 5,013,216) present the drawback of requiring a plurality of parts to be assembled together and of creating assembly zones which are likely to become zones of weakness, e.g. due to delamination, and that is very harmful in terms of mechanical strength, and particularly ability to withstand impacts.

To overcome those drawbacks, French patent document FR 2 861 143 proposes making a preform of three-dimensionally woven fibers or yarns that suffices on its own after injection (optionally after being cut out), to form the final part constituting all of the portions of the turbomachine blade, without having recourse to using inserts or any other fitted elements.

Nevertheless, under those circumstances, regardless of the origin of the polymerized preform (a preimpregnated laminate or a three-dimensionally woven preform), after the intermediate part obtained at the end of injection has been unmolded, there still remain various operations that need to be performed in order to obtain the final part.

These various operations include accurate machining, in particular of the outlines of the leading edge, of the trailing edge, and of the root. These zones need to satisfy very precise structural dimensions. Thus, particular attention is required for the bearing surfaces of the blade root, i.e. surfaces that are subjected to high levels of stress during rotation because they come into contact with the flank of the cavity in the disk that receives the root. In particular, contact wear, or "fretting", occurs between these contacting surfaces as a result of repeated rubbing of one part against another, the resulting friction forces damaging the material by generating heat and leading to various fatigue processes.

Also, amongst the subsequent operations, various protector elements are put into place to reinforce the thermomechanical strength of the composite blade. Thus, metal protection is secured to the leading edge, e.g. in the form of a titanium part that is bonded over the entire surface of the leading edge and over a front portion of the outside surfaces of the pressure-side and suction-side walls. The outside face of the pressure-side wall is also reinforced by putting into place a protective film that can be made of synthetic material (e.g. polyurethane) and that is bonded on the intermediate part directly by adhesive.

When all of those operations need to be performed on each blade of a fan, and possibly on all of the blades in a plurality of low-pressure compressor stages, that leads to manufacturing times that are relatively lengthy and that are significant, economically speaking.

Furthermore, when machining the polymerized preform, the zones in question can be weakened because the machining cuts through some of the initial woven yarns of the preform, and in particular the warp yarns.

OBJECTS AND SUMMARY OF THE INVENTION

An object of the present invention is to provide a method enabling the above-specified drawbacks to be overcome, and in particular to better conserve the integrity of the fibers after injection, and in particular after subsequent machining, by making it possible to put protector elements into place during the step of injection molding the preform.

After the injection molding step, the present invention seeks to obtain a part that presents shape that is closer to that of the final part.

To this end, according to the present invention, the method comprises the following steps:

a) making a preform by three-dimensional weaving of yarns, said preform comprising both the airfoil and the root of the blade, the yarns including tracer yarns that are visually identifiable and that are disposed at least on the surface of the preform;

b) cutting out said preform while leaving intact a series of tracer yarns situated along a reference face of the preform, thereby providing a cut-out preform suitable for taking the shape and the dimensions of portions constituting the blade;

c) pre-deforming said cut-out preform so as to provide a pre-deformed preform;

d) compacting and stiffening said pre-deformed preform;

e) providing an injection mold in which said stiffened preform is placed;

f) injecting into said injection mold a binder comprising a thermosettable resin so as to impregnate the entire stiffened pre-deformed preform and maintain the relative disposition between the yarns of the preform;

g) heating said injection mold; and h) extracting from the mold a composite molded part presenting substantially the shape and the dimensions of said blade.

In this way, it will be understood that by not cutting the series of tracer yarns along the reference surface, i.e. more particularly by not cutting warp yarns extending generally along the longitudinal direction of the preform, and thus of the final part, cohesion is improved, as are the mechanical properties of said reference surface. This surface can in particular be constituted by the surface of the zone of the preform that is to become all or part of the leading edge and/or the pressure-side wall and/or the root.

In addition, by subjecting the cut-out preform to pre-deformation, it is possible to ensure that the zones of the preform are properly disposed and oriented relative to one another, with this being made easier by the fact that while this is being performed, the preform obtained from the weaving and cutting-out step is relatively flexible. The deformation can be implemented in a plurality of steps, taking account of the different portions of the blade and their specific positions and orientations. Thereafter, the pre-deformed positions are frozen in step d) making relative stiffening possible by means of a compacting step because of the presence of the oiling agent that covers the yarns in order to facilitate weaving, which oiling agent may be associated with a tackifying agent, e.g. a dilute epoxy resin.

This ensures that a maximum number of tracer yarns are well positioned during injection, which is performed using the resin transfer molding (RTM) technique. As a result, a maximum number of yarns are subsequently conserved unharmed, either because no machining is performed on this portion, or else because the machining remains strictly parallel to the tracer yarns, thus guaranteeing that a yarn situated parallel to the tracer yarn is not cut somewhere along its extent.

Overall, by means of the method of the present invention, it is possible to manufacture a blade, in particular a fan blade, that, on leaving the injection step, presents various portions of shape and dimensions that are very close to those of the final part.

BRIEF DESCRIPTION OF THE DRAWINGS

Other advantages and characteristics of the invention appear on reading the following description made by way of example and with reference to the accompanying drawings, in which.

MORE DETAILED DESCRIPTION

The method in accordance with the present invention is implemented starting with a preform of the kind that results from three-dimensional weaving, e.g. implemented in accordance with French patent document FR 2 861 143. Thus, the first step a) of the method consists in making such a three-dimensional preform by weaving, the preform comprising warp yarns and weft yarns. Amongst these two groups of yarns, tracer yarns are provided that can be identified visually amongst the others and that are situated regularly, at least at the surface of the preform.

Advantageously, said preform is made up of warp yarns and of weft yarns, with the direction of the warp yarns forming the longitudinal direction of the preform, said preform having at least a first portion made using a first weave for forming the airfoil of a blade, and a second portion, made using a second weave, for forming the root of the blade, with the first and second portions being united by a transition zone in which the first weave is progressively modified so as to become the second weave, thereby obtaining at least a reduction in the thickness of the blade between the first portion and the second portion.

The weaving yarns belong to the group constituted by carbon fibers, glass fibers, silica fibers, silicon carbide fibers, alumina fibers, aramid fibers, and aromatic polyamide fibers.

The preform woven as a single part is subsequently cut out in accordance with step b) of the method of the invention. More exactly, the woven preform is prepared by cutting around its outline while following a predetermined three-dimensional jig designed so that after deformation, the preform complies with the shape of the finished part. This cutting out can be performed by a jet of water and/or by mechanical means (shears, cutter, saw, . . . ), and/or by laser cutting.

Figure 1:
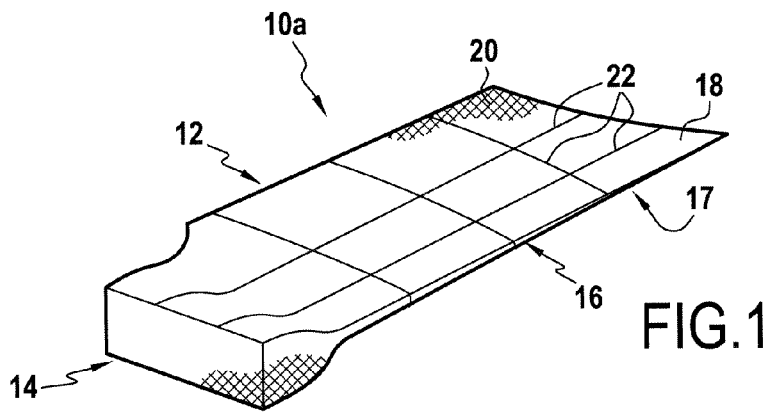
FIG. 1 is a general perspective view of a preform prior to being cut out.

This produces a cut-out preform 10a as shown in FIG. 1. There can be seen the portions that are to form the airfoil 12 and the root 14 of the blade. In particular, the warp and weft yarns 20 used for the three-dimensional weaving are carbon fibers, with glass or Kelvar fibers acting as tracer yarns 22 situated essentially at the surface of the preform, extending along the main direction parallel to the warp yarns and along the transverse direction parallel to the weft yarns. In this way, the tracer yarns 22 appear in a white color on the remainder of the preform which is black, so that the tracer yarns 22 are thus highly visible. In addition, these tracer yarns are detectable by conventional non-destructive inspection technologies (of the X-ray or ultrasound tomography type) suitable for verifying that the final part is in compliance.

In particular, these tracer yarns 22 are shown in this example as being at the surface of both faces (the pressure-side wall 17 and the suction-side wall 18) of the blade at predetermined locations in order to act as reference points for positioning purposes in order to perform the cutting out and other steps of processing the preform as explained below.

In accordance with the present invention, during the cutting-out step, provision is made to retain a series of tracer yarns situated at the surface of the preform along at least one reference face 16, which in the example shown is the face that is to form the leading edge.

Thereafter, in accordance with the present invention, a step c) is performed in which the cut-out preform 10a is subjected to pre-deformation.

More precisely, during step c), said pre-deformation is performed by placing the cut-out preform 10a in a shaping mold 24 presenting various portions that between them define a cavity that is to house the cut-out preform 10a, and presenting marks that act as references for positioning at least some of the tracer yarns 22.

Various identification and positioning systems can be used on the cut-out preform 10a, and in particular a laser projector 26 that projects a light beam onto the ideal location for a tracer yarn 22 so that it is always easy to move the corresponding tracer yarn 22 accordingly in order to obtain the predetermined positioning.

Alternatively, or in addition, masks reproducing the outline and/or the position of all or some of the tracer yarns 22 can be disposed on the preform in order to verify that it is properly positioned.

It will be understood that the cut-out preform 10a could be put into place in the shaping mold 24 in a manner that is sufficiently accurate to perform all of the deformations needed in order to achieve the desired final shape. However, it is also possible, advantageously, to perform this step c) as a plurality of sub-steps.

In particular, during step c), prior to placing the cut-out preform 10a in the shaping mold 24, preliminary pre-deformation is performed that consists, for example, in applying shear in a direction parallel to the main longitudinal direction of the cut-out preform, while holding the cut-out preform 10a in a plane.

Thereafter, the cut-out preform 10b that has been subjected to this shear movement is placed in the shaping mold 24 which puts the cut-out preform into a new configuration, deforming it further by also applying rotation (arrow 25a) thereto about an axis XX' parallel to its main direction.

Provision can also be made for the shaping mold 24 to present a moving portion 24a that is slidable and designed to come into position against the free end of the root 14 of the preform so as to exert stress (arrow 25b), thereby producing the desired deformation of this portion 14 of the preform, or avoiding certain types of deformation in this portion, while deformation is being applied to other portions of the preform 10b.

It should be understood that numerous different possibilities can be envisaged for shaping the cut-out preform 10a by making use of the tracer yarns 22 as reference elements for positioning the preform 10a in the shaping mold 24.

The strategy for placing the cut-out preform 10a in the shaping mold 24 is also associated with the profile as previously cut out, depending on the selected reference surface(s), and in particular concerning the root, the tip, the leading edge 16, the trailing edge, or any other predetermined zone.

Under such circumstances, by subdividing the deformation that is to be applied to the cut-out preform into a plurality of sub-steps, with shear and rotation being separated, as in the above-described example, it is easier to obtain very accurate positioning of all of the portions of the preform, particularly when it is large in size.

Figure 3:
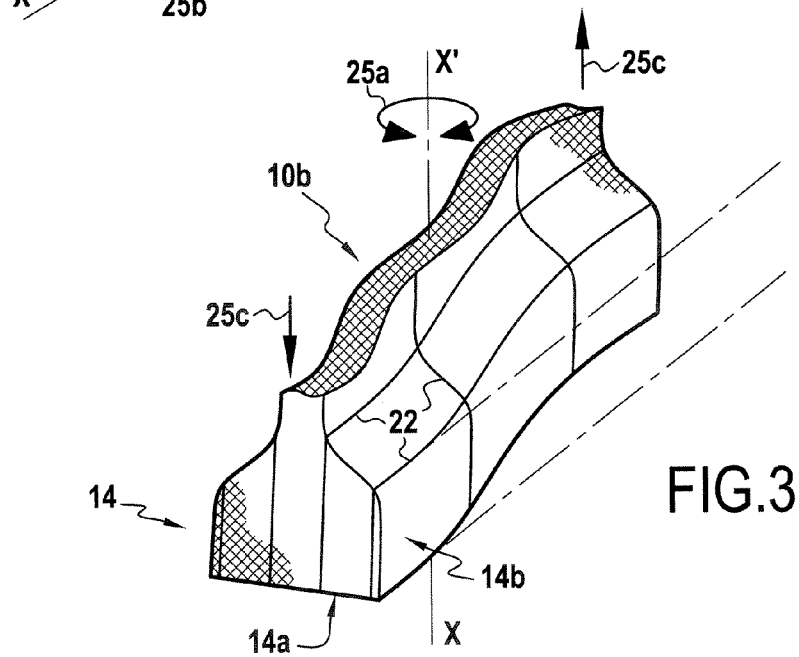

Thus, in FIG. 3, the root 14 of the deformed preform 10b presents a bottom free end face 14a that is no longer plane because of the resultant of the deformation performed in shear and in rotation, together with side faces 14b of outline that is made visible by means of the tracer yarns 22 that are not directed in a rectilinear direction (chain-dotted lines), but that follow a curved outline that results from the shear (arrows 25c) and the rotation (arrow 25a) performed during the pre-deformation step c).

Figure 4:
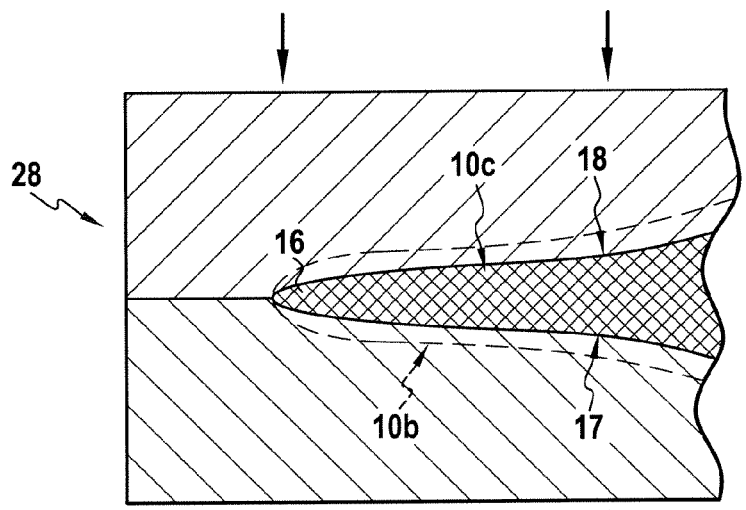

Thereafter, in accordance with step d), compacting is performed that stiffens the pre-deformed preform 10b. The compacting mold 28 used for this purpose, that can be seen in part in FIG. 4, can advantageously be made by associating the shaping mold 24 with appropriate equipment. The compacting mold 28 must be capable of being raised to a temperature of about 100° C., while implementing partial evacuation in order to suck out the solvent that evaporates.

During this step, stiffening is performed by the oiling agents that cover the yarns in order to facilitate weaving. The stiffening serves to freeze the shape given to the cut-out preform 10a sufficiently to enable it to be placed easily in the injection mold without significantly altering its shape.

Where necessary, a tackifying agent can be added within the preform, e.g. a dilute resin, in particular of the epoxy type, the objective being to stick together the woven carbon fibers under the effect of the heat and the pressure that are exerted during compacting step d) in order to ensure that the pre-deformed preform 10b is not subjected to any subsequent deformation, in particular during the injection step.

The compacting mold 28 presents a housing of dimensions and volume that enable the woven preform to be compacted so that the fibers occupy about 55% to 58% of its volume, corresponding substantially to the final density of fibers in the finished part. In the implementation described, the conventional compacting mold 28 is modified at the location that is to receive the reference face 16 of the preform that is to form the leading edge.

At this location, the dimensions of the compacting mold 28 are modified so as to implement additional compacting leading to a fiber density by volume of about 65%. Alternatively, this supercompacting can be obtained after the compacting and stiffening performed in an unmodified compacting mode 28, by using a special tool that performs this additional compacting solely in the zone of the pre-deformed compacting 10b that is to form the leading edge.

Figure 5:
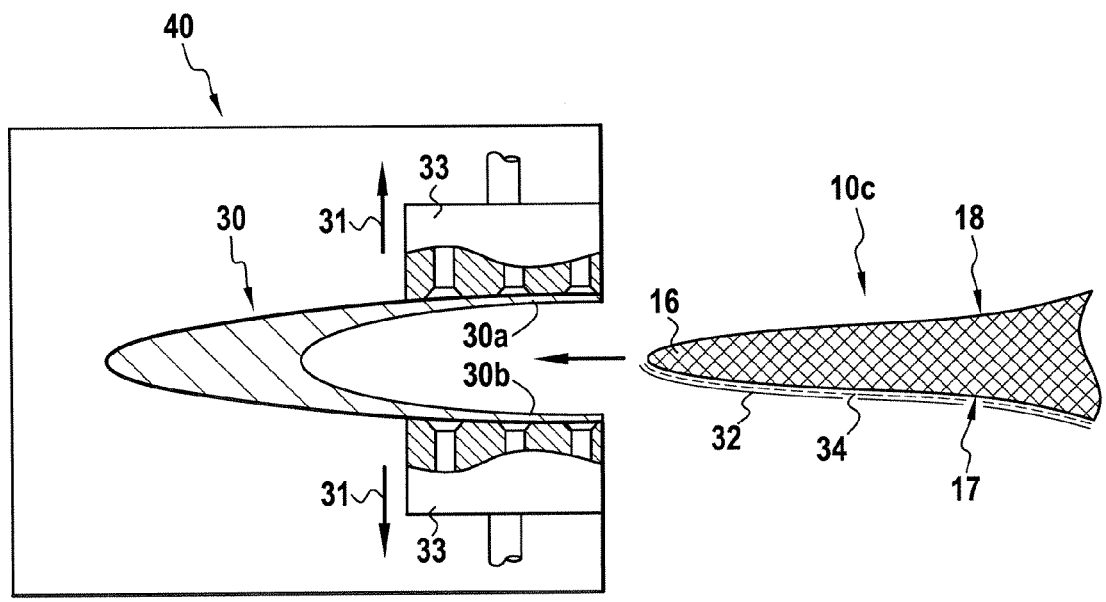

In the implementation shown in FIG. 5, prior to the injection step and after the above-described supercompacting step, a plurality of protector elements are put into place on the compacted preform 10c.

For this purpose, initially, adhesive is used to secure a metal protector element 30 on the leading edge, e.g. an element made of titanium that is secured on the supercompacted reference face 16.

This protector element 30 forms a longitudinally-extending half-sleeve that is fitted over the supercompacted zone on the preform 10c and that presents greatest thickness in its zone constituting the tip of the leading edge 16, with flange-forming portions 30a and 30b on either side thereof.

From the above explanation, it can be seen that during step d) the following sub-steps are performed before, during, or after stiffening:

d1) supercompacting is performed on the pre-deformed preform 10c in the location of the leading edge; and d2) a metal element 30 for protecting the leading edge is mounted on the pre-deformed preform 10c at the location of its leading edge, the element presenting two flanges for overlying portions of the pressure-side and suction-side walls.

More precisely, in order to make it easier to put the protector element 30 into place during step d2), said protector element 30 is placed in a mounting device 40 suitable for splaying apart said flanges 30a, 30b (arrows 31) of said protector element 30, then said mounting device 40 is put into place on the pre-deformed preform 10c so that the two flanges 30a, 30b of said protector element 30 lie on either side of the supercompacted leading edge of the pre-deformed preform 10c, and then said flanges 30a, 30b are released.

It should be observed that adhesive is previously placed on the corresponding surface of the supercompacted leading edge 16 of the pre-deformed preform 10c.

The mounting device 40 is in the form of a mold that includes a spreader device that splays apart the flanges of the protector element, in order to make it easier to insert the preform 10c inside the housing defined by the longitudinal protector element 30.

Figure 6:
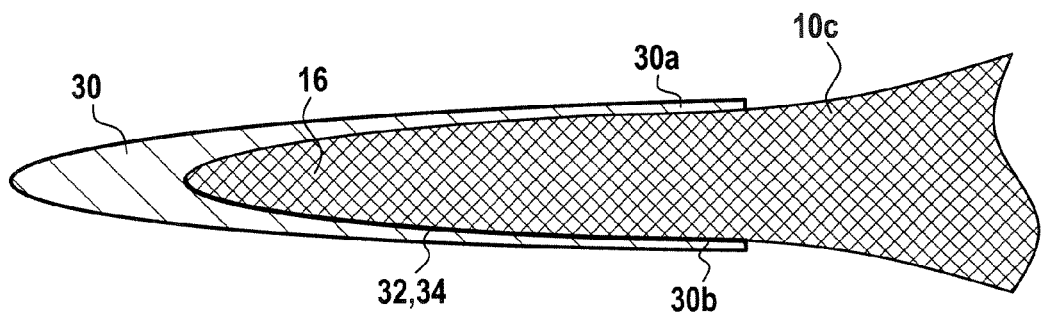

For this purpose, the mounting device 40 is suitable for being partially evacuated by a partial evacuation system 33 so that the metal protector element 30 is disposed inside the housing of the mounting device 40 with the reduced pressure serving to splay apart the flanges 30a, 30b of the protector element (see arrows 31), thus making it easy to place the preform 10c or more precisely the portion 16 of said preform that is to constitute the leading edge, inside the protector element 30 between the flanges 30a, 30b (see FIG. 6).

In addition, in the implementation shown, prior to step d2), a protective film 32 is secured on the pre-deformed preform over a portion of the outside surface of the pressure-side wall that includes the leading edge. This protective film 32, e.g. made of polyurethane, is preferably secured by means of adhesive and serves to provide the pressure-side wall with protection against erosion where it is subjected to the flow of air penetrating into the inside of the fan.

Such a protective film 32 also serves advantageously to reinforce the mechanical properties of the surface of the pressure-side wall 17, which surface is the portion of the blade that is the first to be subjected to the incoming flow of air.

It is then necessary to make use of an adhesive under the protective film 32, e.g. a polyurethane type adhesive, that presents low viscosity and that is capable of withstanding the injection and curing temperatures (respectively about 160° C. and about 180° C.).

As can be seen in FIG. 5, in the implementation described, an interface element 34 is interposed between the protective film 32 and the pre-deformed preform 10c, the interface element 34 forming extra thickness under the protective film 32 and over the yarns 20 of the preform that lie at the surface of the preform.

This interface element 34 seeks to avoid, or at least to minimize, deformation of the protective film 32 due to the surface state of the preform which depends on the position and the diameter of the yarns 20 used for weaving.

For this purpose, for the interface element 34, it is possible to use a flexible interface element 34 situated between the woven yarns 20 and the protective film 32, e.g. a dry fabric that is preimpregnated, or a non-woven fabric, and preferably made of carbon fibers, or else a more rigid shell made from resin only, or else a mixture of resin and fibers.

At the end of all these tests, a rigid preform (not shown) is obtained that presents its final shape, being fitted with various protector elements, namely the metal protector element 30 on the leading edge and the protective film 32 on the pressure-side wall 17, with an interface element 34 disposed beneath it.

Provision is also made during a step e) of preparing the injection mold for at least one spacer (not shown) also to be disposed in said injection mold against the surface of the stiffened preform so as to form the bottom of the blade root.

Figure 2:
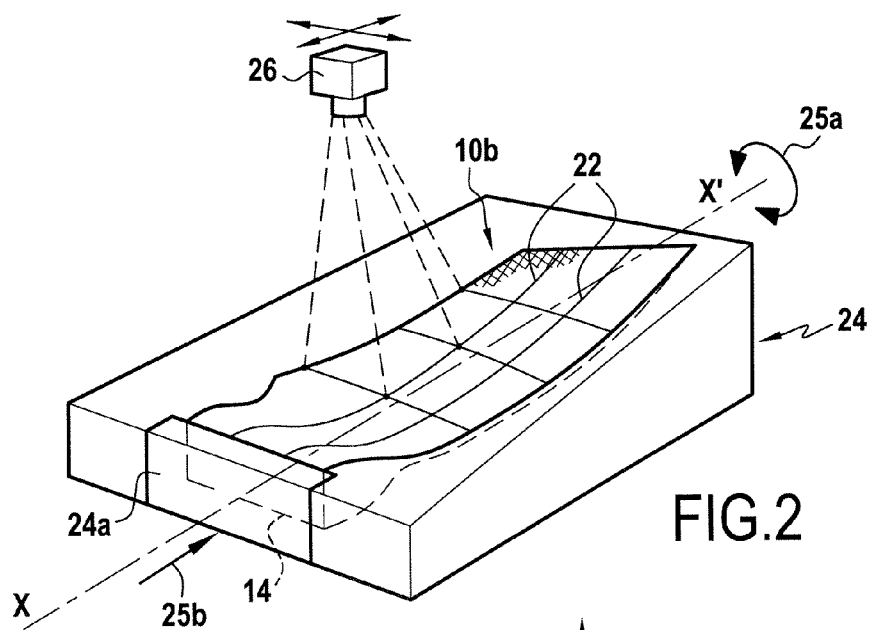
FIGS. 2 to 6 are views in projection of other steps in performing the method of the present invention.

Under such circumstances, during steps f) and g) during which injection molding is performed, said spacer is maintained under constant pressure against the surface of the stiffened preform that is to form the bottom of the blade root, and in particular the surface 14a forming the free end surface of the root (see FIG. 3). For example, as can be in FIG. 2, a spacer is used that is constituted by a part that is similar to the moving piece 24a of the shaping mold 24, and suitable for sliding in a direction parallel to the longitudinal main direction of the blade.

This makes it possible to apply appropriate compacting pressure on the spacer so as to guarantee that the bearing surfaces of the root 14 are properly molded.

It will be understood that using such a spacer under pressure replaces the previously-used technique that consisted in placing eight to fifteen preimpregnated sheets under the root in order to form extra thickness at the bottom of the root during molding, but often associated with the need for dimensions to be rectified by machining, and above all forming an added insert whose fibers/yarns at least are not cohesive with the remainder of the preform, thereby leading to risks of delamination that might form zones of weakness in operation.

The last step consists in the conventional step of injection-molding resin into the inside of the injection mold that in this particular example contains the pre-deformed preform 10c fitted with its protector elements.

It should be understood that during step f), during which the mold is heated, there is softening of the supercompacted zone 16 that has been stiffened during steps d) and d1), i.e. of the supercompacted leading edge of the pre-deformed preform 10c. The woven structure relaxes, thereby taking up the room available thereto in the injection mold, thus ensuring intimate contact between the leading edge, the adhesive, and the protector elements, in particular between the leading edge and the housing inside the protector element 30.

Provision can be made for the injection mold to have other spacers, in particular spacers situated at the edge of the housing receiving the preform, which spacers are removed initially after injection, during tooling, so as to avoid inducing stresses and weakening the blade, in particular in certain zones, because of the differences in the coefficients of thermal expansion of the materials constituting the mold, often metals, and the injected resin.

In this way, it will be understood that the method in accordance with the present invention makes it possible to obtain a blade on removal from the injection mold that is already fitted with a protected leading edge and a protected pressure-side wall, and that presents a root having bearing surfaces that already have their final manufacturing dimensions.

What is claimed is:

1. A method of manufacturing a composite turbomachine blade, the method comprising the following steps:
   a) making a preform by three-dimensional weaving of yarns, said preform comprising both the airfoil and the root of the blade, the yarns including tracer yarns that are visually identifiable and that are disposed at least on the surface of the preform;
   b) cutting out said preform while leaving intact a series of tracer yarns situated along a reference face of the preform, thereby providing a cut-out preform suitable for taking the shape and the dimensions of portions constituting the blade;
   c) pre-deforming said cut-out preform so as to provide a pre-deformed preform;
   d) compacting and stiffening said pre-deformed preform;
   e) providing an injection mold in which said stiffened preform is placed;
   f) injecting into said injection mold a binder comprising a thermosettable resin so as to impregnate the entire stiffened pre-deformed preform and maintain the relative disposition between the yarns of the preform;
   g) heating said injection mold; and
   h) extracting from the mold a composite molded part presenting substantially the shape and the dimensions of said blade.

2. A method according to claim 1, wherein the tracer yarns are of different nature from that of the other yarns.

3. A method according to claim 1, wherein, during step c), said pre-deformation is performed by placing the cut-out preform in a shaping mold.

4. A method according to claim 3, wherein the shaping mold puts the cut-out preform in a configuration that deforms it in rotation about an axis parallel to its main direction.

5. A method according to claim 4, wherein, during step c), prior to placing the cut-out preform in the shaping mold, preliminary pre-deformation is performed that consists in applying shear in a direction parallel to the main direction of the cut-out preform, while maintaining the cut-out preform in a plane.

6. A method according to claim 5, wherein, during step d), before or after stiffening, the following sub-steps are performed:
   d1) supercompacting the pre-deformed preform at the location of the leading edge; and
   d2) mounting a metal, leading edge protector element on the pre-deformed preform at the location of the leading edge, the protector element presenting two flanges for receiving a portion of the pressure-side and suction-side walls.

7. A method according to claim 6, wherein, during step d2), said protector element is placed in a mounting device suitable for splaying apart said flanges of said protector element, and then said mounting device is placed on the pre-deformed preform in such a manner that the two flanges of said protector element are fitted onto the supercompacted leading edge of the pre-deformed preform, and then said flanges are released.

8. A method according to claim 6, wherein, prior to step d2), a protective film is secured on the pre-deformed preform over a portion of the outside surface of the pressure-side wall that includes the leading edge.

9. A method according to claim 8, wherein the protective film is made of polyurethane.

10. A method according to claim 8, wherein an interface element is interposed between the protective film and the pre-deformed preform, the interface element forming extra thickness on the yarns of the preform.

11. A method according to claim 1, wherein, during step e), at least one spacer is also placed in said injection mold against the surface of the stiffened preform that is to form the bottom of the blade root.

12. A method according to claim 11, wherein, during steps f) and g), said spacer is maintained under constant pressure against the surface of the stiffened preform that is to form the bottom of the blade root.

13. A blade according to claim 1, wherein said preform is made up of warp yarns and weft yarns, the direction of the warp yarns forming the longitudinal direction of the preform, wherein said preform comprises at least a first portion made with a first weave forming the airfoil of the blade, and a second portion made with a second weave forming the root of the blade, and wherein the first and second portions are united by a transition zone in which the first weave is modified progressively to become the second weave, thereby obtaining a reduction at least in the thickness of the blade between the second portion and the first portion.

14. A blade according to claim 13, wherein the yarns belong to the group constituted by: carbon fibers; glass fibers; silica fibers; silicon carbide fibers; alumina fibers; aramid fibers; and aromatic polyamide fibers.

15. A blade according to claim 14, wherein the warp yarns and the weft yarns are carbon fibers, and wherein the tracer yarns are glass fibers.

* * * * *